United States Patent [19]

Bernard et al.

[11] Patent Number: 4,606,376

[45] Date of Patent: Aug. 19, 1986

[54] ACCUMULATOR WITH INTEGRAL HIGH PRESSURE RESERVOIR AND RECHARGE VALVE

[75] Inventors: Jerald D. Bernard, Cedar Falls; Sarkis A. Koltookian, Waterloo; Kenneth S. Mealhow, Jesup, all of Iowa

[73] Assignee: Deere & Company, Moline, Ill.

[21] Appl. No.: 730,005

[22] Filed: May 2, 1985

[51] Int. Cl.[4] .............. F16L 55/04

[52] U.S. Cl. .............. 138/30; 138/26; 60/413

[58] Field of Search .............. 138/30, 26; 60/413, 60/415, 418, 416

[56] References Cited

U.S. PATENT DOCUMENTS

| | | | |
|---|---|---|---|
| 2,320,886 | 6/1943 | Quiroz . | |
| 2,773,455 | 12/1956 | Mercier . | |
| 2,904,077 | 9/1959 | Trumper . | |
| 3,149,645 | 9/1964 | Broadwall . | |
| 3,195,577 | 7/1965 | Greer . | |
| 3,230,976 | 1/1966 | Mercier . | |
| 3,695,297 | 10/1972 | Ferrentino | 138/30 |
| 4,195,668 | 4/1980 | Lewis | 138/26 |

OTHER PUBLICATIONS

Deere & Company, Fundamentals of Service, Hydraulics, 1979, pp. 6-1 to 6-8.

*Primary Examiner*—Charles E. Phillips
*Assistant Examiner*—Leo James Peters

[57] ABSTRACT

A self-contained integral accumulator assembly includes a two-part housing joined by a central partition. One housing part encloses high pressure nitrogen. The other housing part encloses a volume which is divided by a flexible bladder into an oil chamber and a precharge chamber. The partition includes a recharge passage and a recharge valve for automatically repressurizing the precharge chamber from the high pressure nitrogen when the precharge pressure falls below a predetermined pressure.

2 Claims, 4 Drawing Figures

ACCUMULATOR WITH INTEGRAL HIGH PRESSURE RESERVOIR AND RECHARGE VALVE

BACKGROUND OF THE INVENTION

The present invention relates to an hydraulic accumulator.

Hydraulic accumulators are used to store a volume of oil under pressure. Typical accumulators include bladders or pistons with seals which separate the hydraulic fluid from an inert gas, such as nitrogen, which is stored at high pressure to provide the compressibility needed for accumulator action. Such gases slowly escape through bladders and seals, resulting in continual loss of pressure. This requires periodic servicing to recharge the gas supply to maintain or restore proper performance.

SUMMARY OF THE INVENTION

An object of this invention is to provide an hydraulic accumulator which requires infrequent servicing for repressurization.

Another object of the present invention is to provide an hydraulic accumulator with automatic gas pressurization.

Another object of this invention is to provide such an accumulator wherein the repressurization source and valve are integral to the accumulator.

These and other advantages are achieved by this invention which includes a two-part housing sealingly joined to a partition. One housing part encloses high pressure nitrogen. The other housing part encloses a volume which is divided by a flexible bladder into an oil chamber and a precharge chamber. The partition includes a recharge passage and a recharge valve for automatically repressurizing the precharge chamber from the high pressure nitrogen when the precharge pressure falls below a predetermined pressure. The entire assembly forms a self-contained integral unit.

DETAILED DESCRIPTION

Figure 1:
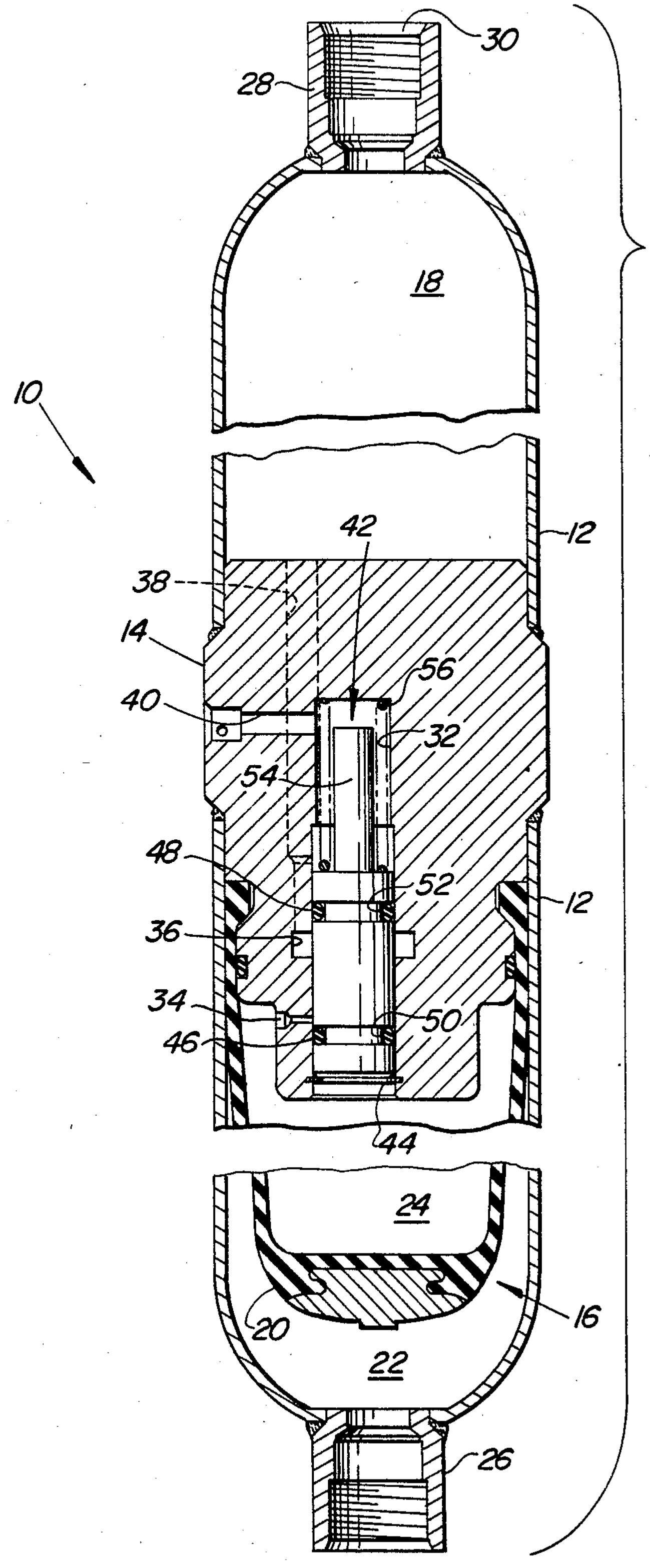
FIG. 1 is a cross-sectional view of an accumulator constructed according to the present invention.

The accumulator assembly 10 includes a two-part housing 12 joined by a cylindrical, axially extending partition 14 which separates first chamber 16 from second chamber 18. A flexible bladder 20 is sealingly coupled between the housing 12 and the partition and divides the first chamber into a fluid-receiving chamber 22 and a precharge chamber 24. An inlet 26 communicates fluid chamber 22 with a hydraulic circuit or function (not shown). Chamber 18 contains highly pressurized gas, such as nitrogen. Chamber 18 is supplied via inlet 28 which is normally sealed by plug 30.

A blind bore 32 extends part way into partition 14 from an end which is open to chamber 24. A radial passage 34 communicates bore 32 with precharge chamber 24. Bore 32 is communicated with chamber 18 via annular groove 36 and axial passage 38. The inner end of bore 32 is communicated to atmosphere via radial vent passage 40.

A valve spool 42 is movably mounted in bore 32 and is retained therein by a snap ring 44. Spool 42 carries O-ring seals 46 and 48 in corresponding grooves 50 and 52. A stem 54 projects axially from one end of spool 48 and receives a spring 56 which is biased to urge spool 42 into engagement with snap ring 44. Thus, one end of spool 42 is exposed to pressure in recharge chamber 24 while its other end is exposed to atmosphere via vent passage 40.

In the position shown, valve spool 42 will permit gas to flow from high pressure chamber 18 to precharge chamber 24 via passage 38, groove 36, bore 32 and passage 34. This will increase the pressure in precharge chamber 24 until eventually, the pressure differential between chamber 24 and atmosphere becomes high enough to move spool 42 to the right against the bias of spring 56. When O-ring seal 46 moves past passage 34, this closes communication between chambers 18 and 24 until the pressure in chambers 24 drops enough to permit spring 56 to move spool 42 back to the position shown.

Figure 2:
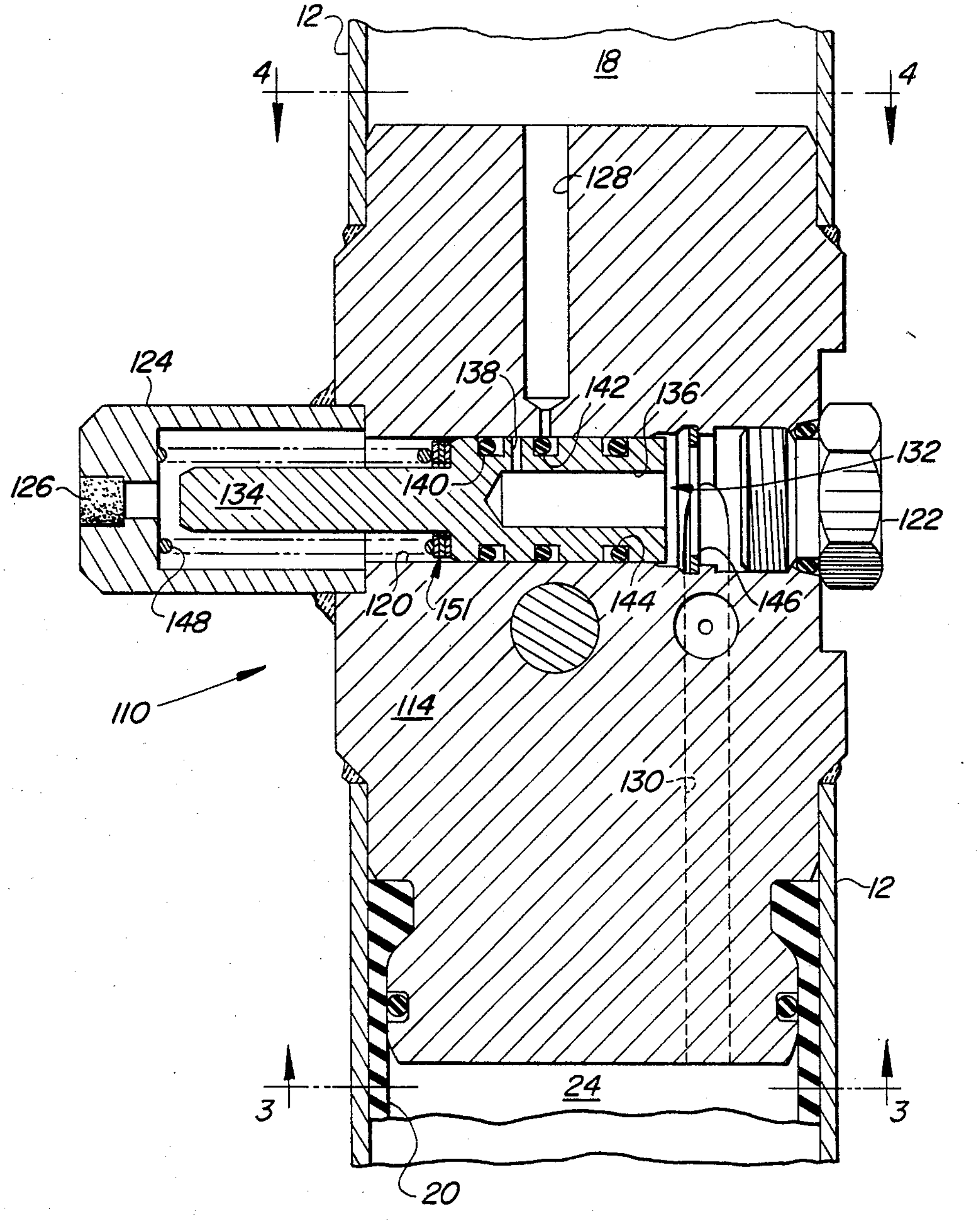
FIG. 2 is a cross-sectional view of a preferred embodiment of the present invention.

A preferred embodiment of the present invention will now be described with reference to FIGS. 2–4. In this embodiment, the accumulator 110 has a generally axially extending cylindrical partition 114 which separates high pressure chamber 18 from precharge chamber 24.

A valve bore 120 extends radially through partition 114. One end of bore 114 is closed by a threaded plug 122. The other end of bore 120 is enclosed by a hollow cylindrical cap 124 which projects radially outwardly from the partition 114. A vent passage 126 communicates atmosphere to the interior of cap 124.

An inlet passage 128 communicates valve bore 120 with the high pressure chamber 18. An outlet passage 130 communicates bore 120 with precharge chamber 24.

A valve member 132 is slidable in bore 120 and includes a stem 134 projecting therefrom and a blind bore 136 extending part way therein. A passage 138 extends radially with respect to valve member 132 and communicates from the blind bore 136 to the outer cylindrical surface of valve member 132. There are three O-ring seals 140, 142 and 144 spaced apart in corresponding annular grooves in the surface of valve member 132.

A snap ring retainer 146 prevents high pressure blowout of valve member 132 when plug 122 is removed for servicing. Spring 148 urges valve member 132 upwards, viewing FIG. 2. Spring tension can be adjusted by annular shims 151.

Figure 3:
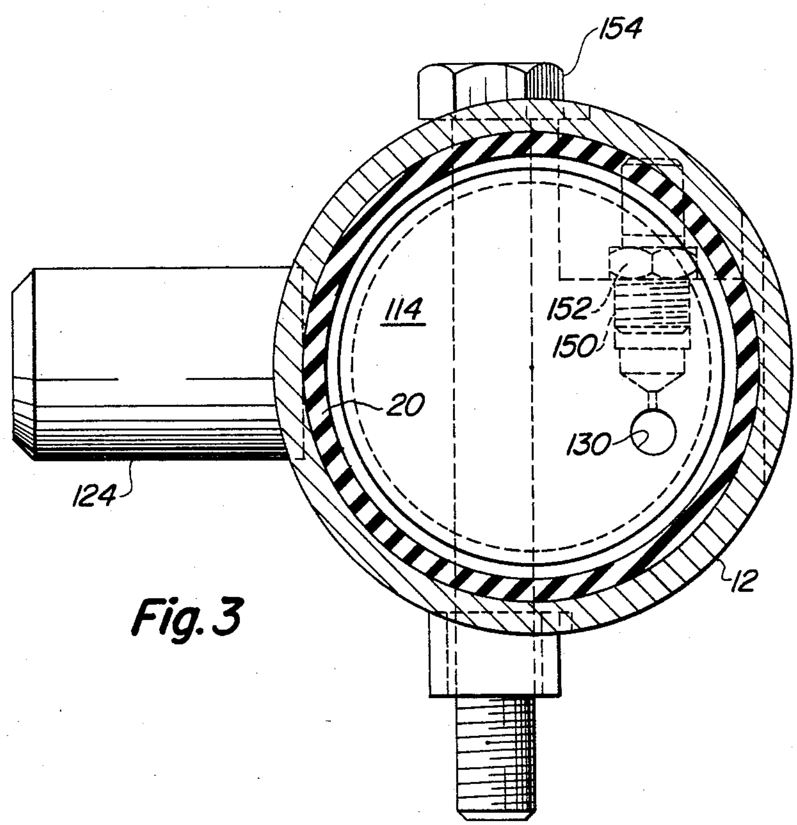
FIG. 3 is an end view in the direction of arrows 3—3 of FIG. 2.

As best seen in FIG. 3, the accumulator 110 has an accumulator test port 150 which extends between outlet passage 130 and the outer surface of partition 114. Test port is normally closed by a threaded plug 152. Also, a mounting bolt 154 extends through partition 114 for use in mounting the accumulator 110.

Figure 4:
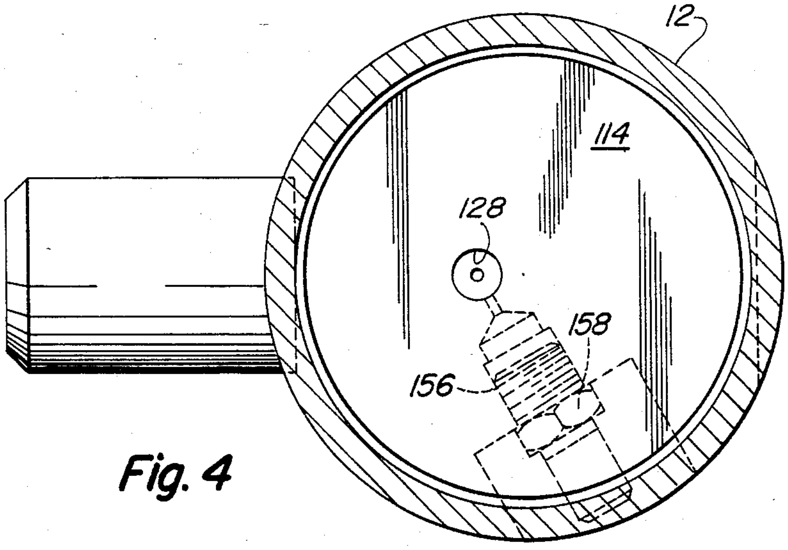
FIG. 4 is an end view in the direction of arrows 4—4 of FIG. 2.

As best seen in FIG. 4, a high pressure fill port 156 extends between inlet passage 128 and the exterior of partition 114, and is normally closed by threaded plug 158. This permits the elimination of inlet 28 and plug 30 from the end of housing 12.

When pressure in precharge chamber 24 is sufficient, the inlet 128 will be sealed off between O-ring seals 142 and 144. If the precharge pressure becomes too low, spring 148 extends and pushes valve member 132 upwards, viewing FIG. 2, until seal 142 moves past inlet 128 so that high pressure gas flows between seals 140 and 142 and via passage 138, bore 136 and passage 130 to replenish the precharge chamber 24.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. An hydraulic accumulator comprising:

a housing having a partition therein dividing the interior of the housing into a first chamber, and a second chamber for holding highly pressurized gas;

a bladder in the housing dividing the first chamber into an hydraulic fluid-receiving chamber and into a gas-receiving precharge chamber;

a recharge passage extending through the partition from the second chamber to the precharge chamber, the passage comprising a blind bore having one end open to the precharge chamber, an outlet passage communicating the bore with the precharge chamber and an inlet passage communicating the bore with the second chamber;

a recharge valve in the recharge passage for permitting gas flow from the second chamber to the precharge chamber only when pressure in the precharge chamber is less than a desired pressure, the recharge valve comprising a valve member slidable in the bore and exposed at one end to pressure in the precharge chamber, the valve member being movable from a first position blocking communication between the inlet and outlet passages to a second position communicating the inlet passage with the outlet passage, the recharge valve also comprising a spring urging the valve member toward its second position, pressure in the precharge chamber urging the valve member towards its first position; and a vent passage for communicating an inner end of the blind bore with atmosphere and for exposing the other end of the valve member to atmospheric pressure, the valve member moving in response to a pressure differential between atmosphere and pressure in the precharge chamber.

2. An hydraulic accumulator comprising:

a housing having a partition therein dividing the interior of the housing into a first chamber, and a second chamber for holding highly pressurized gas, the partition having the general shape of an axially extending cylinder and including a radially extending valve bore therein and an axially extending inlet passage communicating the valve bore with the second chamber;

a bladder in the housing dividing the first chamber into an hydraulic fluud-receiving chamber and into a gas-receiving precharge chamber, the partition including an axially extending outlet passage communicating the valve bore with the precharge chamber;

a recharge passage extending through the partition from the second chamber to the precharge chamber;

a recharge valve in the recharge passage for permitting gas flow from the second chamber to the precharge chamber only when pressure in the precharge chamber is less than a desired pressure, the recharge valve comprises a valve member slidable in the valve bore and exposed at one end to pressure in the precharge chamber, the valve member being movable from a first position blocking communication between the inlet and outlet passages to a second position communicating the inlet passage with the outlet passage, the recharge valve also comprising a spring urging the valve member toward its second position, pressure in the precharge chamber urging the valve member towards its first position; and a vent passage for communicating an end of the valve bore with atmosphere and for exposing another end of the valve member to atmospheric pressure, the valve member moving in response to a pressure differential between atmosphere and pressure in the precharge chamber.

* * * * *